United States Patent

Pusch

[11] Patent Number: 5,986,585
[45] Date of Patent: *Nov. 16, 1999

[54] DEVICE FOR CONVERTING A MECHANICAL VARIABLE INTO AN ELECTRICAL VARIABLE

[75] Inventor: Olaf Pusch, Villingen, Germany

[73] Assignee: Deutsche Thomson-Brandt GmbH, Villingen-Schwenningen, Germany

[*] Notice: This patent is subject to a terminal disclaimer.

[21] Appl. No.: 08/400,205

[22] Filed: Mar. 7, 1995

[30] Foreign Application Priority Data

Mar. 10, 1994 [DE] Germany .............................. 44 08 050

[51] Int. Cl.⁶ ................................................... H03M 11/00
[52] U.S. Cl. .............................. 341/20; 178/18; 33/1 M; 345/179
[58] Field of Search .............................. 341/20; 345/179; 178/18; 33/1 M; 346/33 M

[56] References Cited

U.S. PATENT DOCUMENTS 4,419,672  12/1983  Hird ......................................... 346/33
5,428,355  6/1995  Jondrow ..................................... 341/20
5,576,705  11/1996  Bardachenko ............................. 341/20

FOREIGN PATENT DOCUMENTS 2224791  5/1990  United Kingdom .
89/08820  9/1989  WIPO .

Primary Examiner—Brian Zimmerman
Assistant Examiner—Albert K. Wong
Attorney, Agent, or Firm—Joseph S. Tripoli; Peter M. Emanuel; Frederick A. Wein

[57] ABSTRACT

A device for converting a mechanical deflection into a corresponding electrical variable which can be used to produce deflection. A cost-effective, energy-saving and good-resolution position measuring device, indicating transmitter or desired position value transmitter. One end of a pair of sliding contacts is driven by electrical drive signals over at least two contact surfaces, the other end of the pair of sliding contacts is displaced over conductor tracks led in parallel, as a result of which drive signals are transmitted via the contacted conductor tracks as evaluation signals. The device is usable in open-loop and closed-loop control technology, for example cursor control on a screen via an infrared remote control transmitter.

16 Claims, 2 Drawing Sheets

DEVICE FOR CONVERTING A MECHANICAL VARIABLE INTO AN ELECTRICAL VARIABLE

FIELD OF THE INVENTION

The invention relates to a device for converting a mechanical deflection into corresponding electrical variable.

BACKGROUND

The device may be used as a two-dimensional position measuring device, indicating transmitter or desired position value transmitter for an area of a few square centimetres.

Known embodiments of desired value transmitters are used, for example, for remote control purposes as a mouse or a "trackball" in computer technology, or as "joystick" in model construction.

The principle of construction of a "mouse" or of a "trackball" consists of two incremental rotary encoders arranged orthogonally and a rubberized ball supported rotatably in a receiving mounting and bearing on both rotary encoder axes. By means of rotating the ball in any desired direction, either one or both rotary encoder axes are changed simultaneously, so that a specific rotational change of the rotary encoder corresponds to the angle of the rotary movement of the ball. A signalprocessing stage for supplying evaluation pulses is usually connected to the circuitry supplying pulses, for evaluation.

Instead of having rotary encoders, a "joystick" has two potentiometers which are coupled to a control lever via a universal joint. Each position of the control lever has allocated to it a corresponding position of the potentiometer slides. The voltage values of each potentiometer are fed to an evaluation circuit.

Disadvantageous in the case of both the above-described concepts are both the relatively high manufacturing costs (material and production) and also the high energy consumption.

SUMMARY OF THE INVENTION

The main object of the present invention is to supply a positioning and position measuring device which is cost-effectively produced, has exceptional low engery consumption, along with sufficiently high resolution.

A device for converting a mechanical deflection into a corresponding electrical variable, in which one end of a pair of sliding contacts is driven by electrical drive signals over at least two contact surfaces, the other end of the pair of sliding contacts is displaced over a number, necessary for a specific resolution, of conductor tracks led in parallel, and, by means of the displacement of the pair of sliding contacts, the drive signals are transmitted via the contacted conductor tracks at their end as evaluation signals.

Using this device, the drive signal is advantageously transmitted in a theoretically loss-free manner and uninfluenced by the connections of the contact surfaces, via the slides and via the conductor tracks contacted by the slides, to the ends of the conductor tracks. An additional aspect of the present invention is the cost-effective production of the contact surfaces and the conductor tracks on a carrier material. The production can be carried out, for example, on a copper-laminated printed circuit board in only one operation.

If the conductor tracks, running parallel, on the carrier material are guided further at right angles to each other, it is possible to sample and to determine not only one dimensional deflections but two dimensional deflections simultaneously.

A useful extension of the device consists in increasing the number of the conductor tracks led at right angles to each other, corresponding to the specific requirements.

The advantage lies in the fact that with an increasing number of conductor tracks, the resolution increases to the same extent. The limit of the resolution lies, actually, only in the fineness of structure of the conductor tracks, the mechanical precision of the pair of sliding contacts and/or in the dimensioning of the device.

The application of two further contact surfaces for subdividing the sampling region into a total of four sections is recommended. In addition, a preferred arrangement of the conductor tracks should be carried out in such a way that the conductor tracks are led back in a narrow 180° bend, once again parallel to the conductor tracks already present.

The decisive advantage of two additional contact surfaces and of guiding back the conductor tracks lies in the detection of the positive and of the negative X-/Y- range and, in conjunction with this, the ability to drive individual position points which is 4 times higher than in the case of a simple guidance of the conductor tracks.

The driving of the contact surfaces and the evaluation of the evaluation signals, which can be picked off at one or the other end of the conductor tracks, can be undertaken, for example, by a microprocessor.

BRIEF DESCRIPTION OF THE DRAWINGS

The invention will be explained in more detail in the following exemplary embodiment, with reference to the drawing figures, in which.

DETAILED DESCRIPTION OF THE INVENTION

Figure 1:
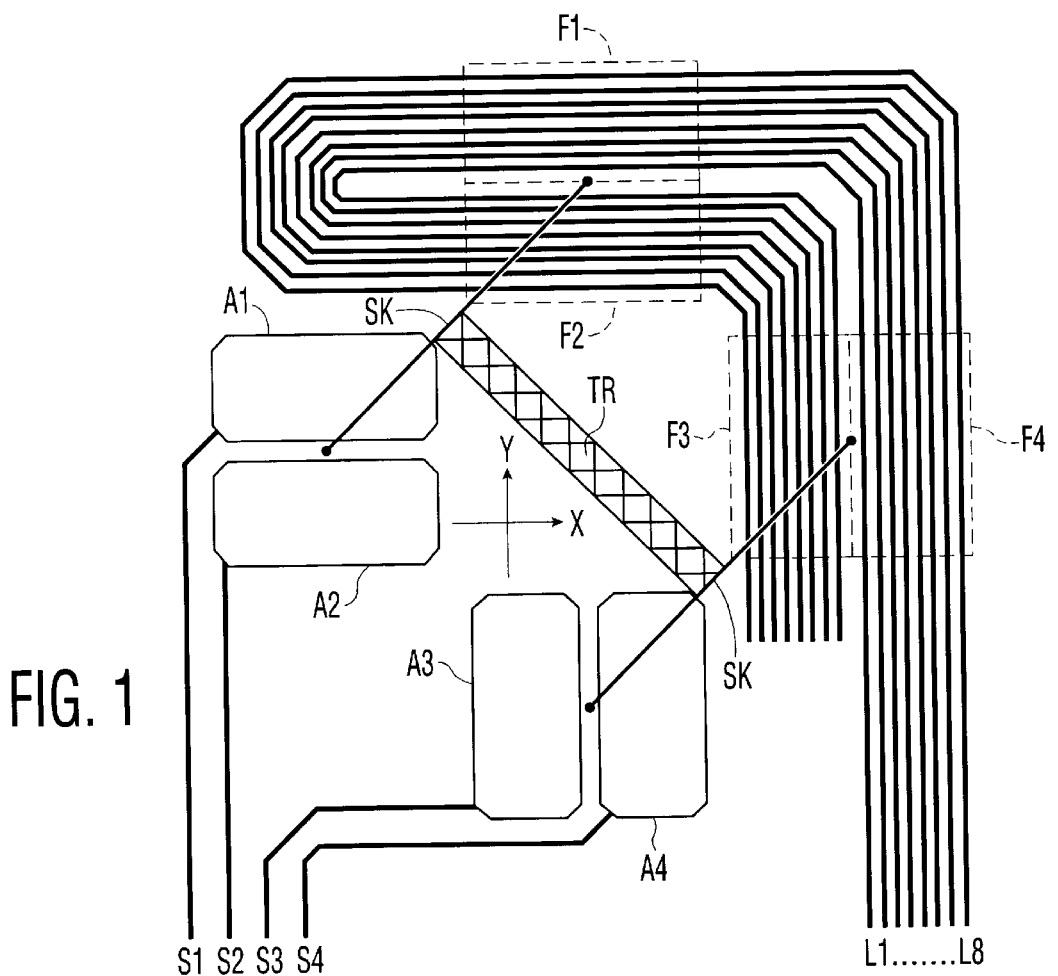
FIG. 1 shows a position measuring device with detection of the positive and negative X-/Y-range.

Using the exemplary embodiment of a position measuring device shown in FIG. 1, two dimensions and up to 17 steps can be resolved.

Figure 2:
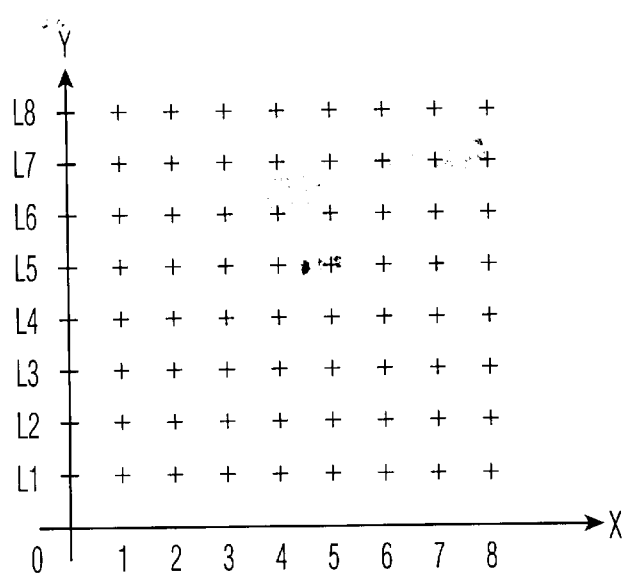
FIG. 2 shows a point grid of the addressable positions per quadrant.

As shown in FIG. 2, a point grid with integral coordinates can be represented in a Cartesian coordinate system. Here, in total, there are 9 9=81 positions for only one quadrant or 17 17=289 positions for all four quadrants.

The position measuring device in FIG. 1 has four rectangular contact surfaces A1 to A4 as well as eight conductor tracks L1 to L8 lying parallel and guided in a serpentine fashion. Two slides SK applied on a carrier TR and each having two contacts bridge over two of the four contact surfaces A1 to A4 using one, two or none of the conductor tracks L1 to L8, which are located inside the surface sections F1 to F4, shown dashed and assigned to the contact surfaces A1 to A4, on the serpentine conductor tracks.

The sliding contact carrier TR is to be suspended in such a way that it can be displaced in parallel both in the X- and also in the Y- direction, its rotation with respect to the eight conductor tracks L1 to L8 having to be excluded.

A parallel displacement of the contact carrier in the X-Y plane produces an electrical connection between two of the surfaces A1 to A4 and one, two or none of the conductor tracks L1 to L8 in the associated surface section F1 to F4. The amplitude of the deflection can then be detected via the eight conductor tracks. If, because of too wide a sliding contact SK, too of the lines L1 to L8 are bridged across, the higher-valued line is evaluated in this exemplary embodiment. This has been decided arbitrarily and can also be carried out with the lower-valued line. Equally well, there is the possibility of beginning the evaluation either with the line L1 or with the line L8.

The position measuring device can be particularly advantageously driven and evaluated with the aid of a processor. For this purpose, the four rectangular contact surfaces A1 to A4 are connected to an output port via in each case one control line S1 to S4 and the eight measuring lines L1 to L8 are connected to an input port of the microprocessor. Using the time-division multiplex method, the four contact surfaces A1 to A4 are now set individually to logic one in a sequence arbitrarily specifiable by the user, whereupon it is determined at the input port whether and which of the conductor tracks L1 to L8 transmits this logic one (high level). This method has the advantage that, for resolving the deflection in both dimensions, including the signs, the same eight conductor tracks can be used. The respective three non-active contact surfaces must nevertheless be switched by the processor to be highly resistive. Otherwise in the event of a deflection of the sliding contact SK in the direction of the angle bisector (45°), the high level of a contact surface is short-circuited to earth via both slides and a contact surface lying at low level.

Figure 3:
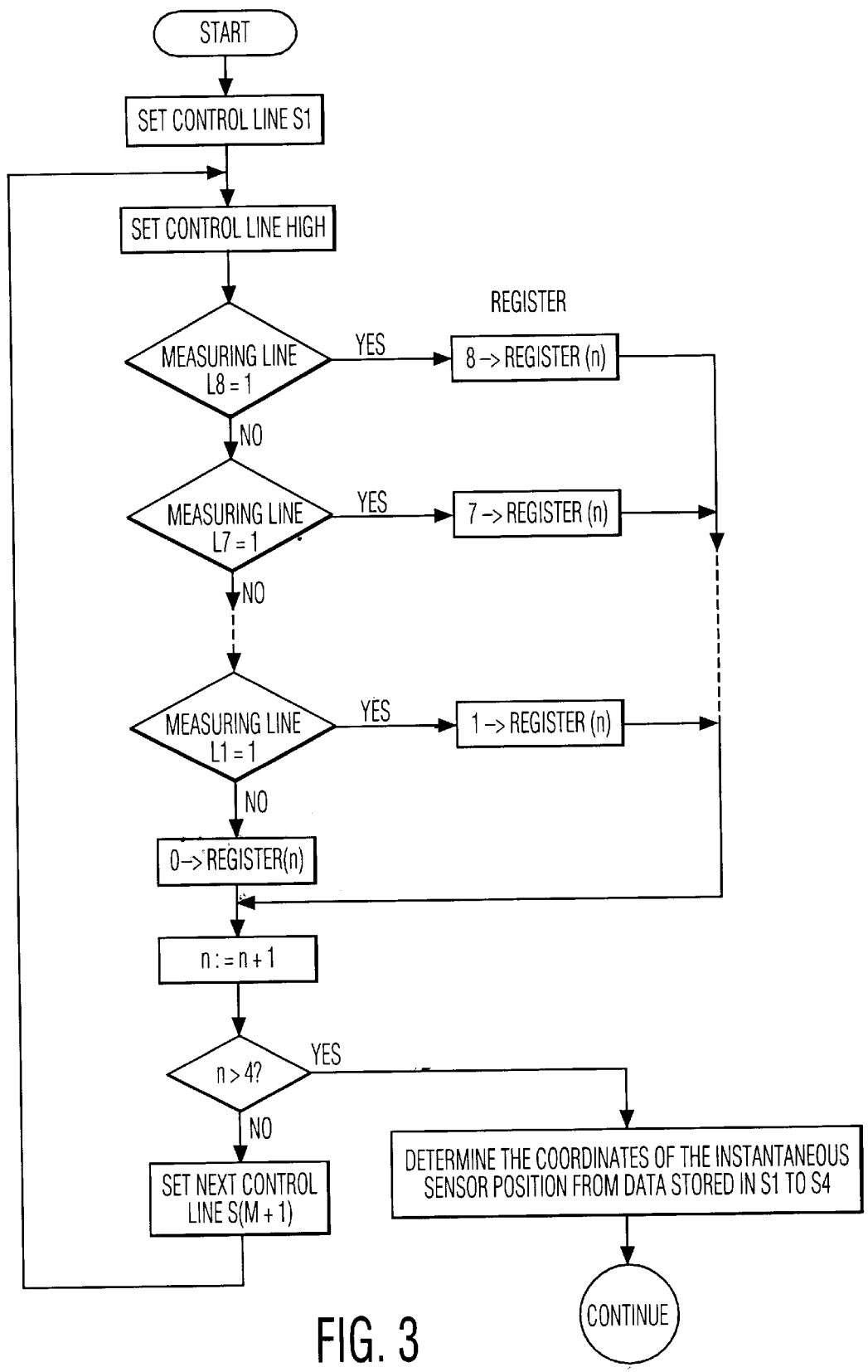
FIG. 3 shows a flow diagram of a control program for a position measuring device.

FIG. 3 gives an overview of a sequence controller. The evaluation by the processor is carried out by means of serial testing of all eight lines L1 to L8 with regard to a high level. Each of these eight lines, beginning with L8 in this exemplary embodiment of the sequence controller, is allocated a four-bit data word, which in the event of a high level of the line is stored individually in a register of the processor, together with the sign bit, for each dimension.

An eight-bit data word is constructed from the two four-bit data words of both dimensions, without taking into account the signs. The said eight-bit data word can either be evaluated directly or, in an expedient way, a table in a ROM of the driving processor can be addressed therewith. The sign determination is already carried out under software control when driving the control lines S1 to S4, since a specific quadrant can be assigned to each pair of contact surfaces in its specific pairing.

If an angular measurement is to be carried out, this is likewise based on a polar coordinate transformation carried out in software. For this purpose, a table stored in the ROM of the driving processor, is indirectly addressed via the X- and Y- coordinates of the sliding contact pair SK. In this table, an angle assigned to each grid point is stored with a resolution dependent on the character of the table. In a second table, which is reached via an offset to the original address, data can be stored for this purpose about the magnitude of a velocity vector, which can be transmitted as an additional data word apart from the angle information.

If this position measuring device is used, for example, in an infrared remote control transmitter for TV sets, upon actuating the sliding contact carrier in any desired direction and to any specific point, a driven cursor runs on a TV screen, with a higher or lower velocity, to the position previously determined with the sliding contact carrier.

This position measuring device, positioning and desired position value transmitter can be used for a broad spectrum of applications in open-loop and closed-loop control technology.

I claim:

1. Device for converting an at least one-dimensional mechanical deflection into an electrical variable corresponding to this deflection, wherein one end of a pair of sliding contacts is driven by electrical drive signals over at least two contact surfaces, another end of the pair of sliding contacts is displaced over a number, necessary for a specific resolution, of conductor tracks led in parallel within a surface section, and by means of the displacement of the pair of sliding contacts, drive signals are transmitable via contacted conductor tracks as evaluation signals.

2. Device according to claim 1, wherein for resolving the mechanical deflection in two dimensions, the same conductor tracks are used as for the deflection in one dimension.

3. Device according to claim 1, wherein an increase or reduction of the number of conductor tracks results in a correspondingly high or low resolution.

4. Device according claim 1, wherein by applying two further contact surfaces arranged as a pair, the resolution of the mechanical deflection in two dimensions is carried out both in the positive and in the negative direction.

5. Device according to claim 1, wherein by turning the conductor tracks, running in parallel, through 180° and guiding them back, the ability to drive individual position points is four times higher.

6. Device according to claim 1, wherein the drive signals are transmitted via the contacted conductor tracks at their ends as evaluation signals.

7. Device according to claim 1, wherein the driving and the evaluation of the signals are undertaken by a microprocessor.

8. Device according to claim 2, wherein an increase or reduction of the number of conductor tracks results in a correspondingly higher or lower resolution.

9. Device according to claim 2, wherein by applying two further contact surfaces arranged as a pair, the resolution of the mechanical deflection in two dimensions is carried out both in a positive direction and in a negative direction.

10. Device according to claim 3, wherein by applying two further contact surfaces arranged as a pair, resolution of the mechanical deflection in two dimensions is carried out both in a positive direction and in a negative direction.

11. Device according to claim 2, wherein by turning the conductor tracks, running in parallel, through 180° and guiding them back, the ability to drive individual position points is four times higher.

12. Device according to claim 4, wherein by turning the conductor tracks, running in parallel, through 180° and guiding them back, the ability to drive individual position points is four times higher.

13. Device according to claim 2, wherein the drive signals are transmitted via the contacted conductor tracks at their ends as evaluation signals.

14. Device according to claim 5, wherein the drive signals are transmitted via the contacted conductor tracks at their ends as evaluation signals.

15. Device according to claim 2, wherein the driving and the evaluation of the signals are undertaken by a microprocessor.

16. Device according to claim 6, wherein the driving and the evaluation of the signals are undertaken by a microprocessor.

* * * * *